US005740267A

United States Patent [19]

Echerer et al.

[11] Patent Number: 5,740,267
[45] Date of Patent: *Apr. 14, 1998

[54] RADIOGRAPHIC IMAGE ENHANCEMENT COMPARISON AND STORAGE REQUIREMENT REDUCTION SYSTEM

[76] Inventors: Scott J. Echerer, 428 Lafayette Ave., Cayce, S.C. 29033; Stephen R. McNeill, 1809 Woodvalley Ct., Columbia, S.C. 29212

[*] Notice: The term of this patent shall not extend beyond the expiration date of Pat. No. 5,384,862.

[21] Appl. No.: 339,817

[22] Filed: Nov. 15, 1994

Related U.S. Application Data

[63] Continuation-in-part of Ser. No. 47,261, Apr. 13, 1993, Pat. No. 5,384,862, which is a continuation-in-part of Ser. No. 891,406, May 29, 1992, Pat. No. 5,272,760.

[51] Int. Cl.[6] .................................................. G06K 9/00
[52] U.S. Cl. .............................. 382/132; 382/282; 382/284; 382/298
[58] Field of Search ................................ 382/132, 282, 382/284, 298

[56] References Cited

U.S. PATENT DOCUMENTS

| | | | |
|---|---|---|---|
| 4,160,906 | 7/1979 | Daniels et al. | 250/322 |
| 4,189,775 | 2/1980 | Inouye et al. | 364/413.16 |
| 4,217,641 | 8/1980 | Naparstek | 364/414 |
| 4,437,161 | 3/1984 | Anderson | 364/414 |
| 4,641,242 | 2/1987 | Kimura | 364/414 |
| 4,731,865 | 3/1988 | Sievenpiper | 382/54 |
| 4,748,511 | 5/1988 | Nichols et al. | 358/256 |
| 4,858,129 | 8/1989 | Mori | 364/413.14 |
| 4,860,112 | 8/1989 | Nichols et al. | 358/400 |
| 4,875,225 | 10/1989 | Hunold | 378/99 |
| 4,910,609 | 3/1990 | Nicholas et al. | 358/433 |
| 4,920,491 | 4/1990 | Eberhard et al. | 382/131 |
| 4,999,497 | 3/1991 | Funahashi et al. | 250/327.2 |
| 5,038,369 | 8/1991 | Nishiki | 378/62 |
| 5,046,118 | 9/1991 | Ajewole et al. | 382/51 |
| 5,048,110 | 9/1991 | Nakajima | 382/54 |
| 5,077,768 | 12/1991 | Shigyo et al. | 378/98 |
| 5,079,698 | 1/1992 | Grenier et al. | 364/413.13 |
| 5,086,392 | 2/1992 | Nakajima | 364/413.22 |
| 5,091,963 | 2/1992 | Lih et al. | 382/274 |
| 5,111,308 | 5/1992 | Bachar | 358/448 |
| 5,122,871 | 6/1992 | Israeli et al. | 358/75 |
| 5,150,421 | 9/1992 | Morishita et al. | 382/6 |
| 5,172,418 | 12/1992 | Ito et al. | 382/132 |
| 5,172,419 | 12/1992 | Manian | 382/132 |
| 5,179,597 | 1/1993 | Takeo | 38/41 |
| 5,247,352 | 9/1993 | Nagler et al. | 358/515 |
| 5,272,760 | 12/1993 | Echerer et al. | 382/132 |
| 5,384,862 | 1/1995 | Echerer et al. | 382/132 |

OTHER PUBLICATIONS

A.A. van Heck, Display system for computed tomagraphic (CT)images, 3/79, pp. 244–248.

Horii et al., Unified Digital image display and processing system, 1981, pp. 340–345.

(List continued on next page.)

*Primary Examiner*—Joseph Mancuso
*Assistant Examiner*—Timothy M. Johnson
*Attorney, Agent, or Firm*—Michael A. Mann, PA

[57] ABSTRACT

A system for processing a radiograph such as an x-ray includes a scanner, a computer with monitor for displaying a digital copy of the radiograph and pet-forming a number of enhancements. The computer stores the digitized image in memory in such a way that it cannot be modified, stores temporarily a second copy of the image in random access memory for display, and stores the enhancements separately in a data file so that, each time the user wishes to see an enhanced image, the enhancements are applied to the displayed digital image as an overlay, rather than being stored as a copy of the enhanced image. Less space is required for storage when only the unenhanced image and the enhancements are stored than if the unenhanced and the enhanced images are stored. Furthermore, not only is the unenhanced image available for a variety of purposes (stored in such a way that it cannot be modified), but the enhancements that are made to produce the enhanced, displayed image are reproduced the same way each time.

20 Claims, 6 Drawing Sheets

OTHER PUBLICATIONS

R.K. Taira, et al., "Design of a PACS Cluster Controller," SPIE vol. 1654 Medical Imaging VI: PACS Design & Evaluation (1992), pp. 203–207.

W.V. Glenn, Jr., et al., "Low-Cost Medical Image Storage and Manipulation Using Optical Disc Subsystems," in SPIE vol. 1248 Storage and Retrieval Systems and Applications (1990), pp. 214–219.

G.R. Thoma, et al., "Interfacing Optical Disks To A Document Image Storage and Retrieval System," Journal of Imaging Technology vol. 12, No. 5 (Oct. 1986), pp. 288–292.

W.S. Weinberg, et al., "On–line Acquisition Of CT and MRI Studies From Multiple Scanners," SPIE vol. 1446 Medical Imaging V: PACS Design & Eval pp. 430–435 (1991).

E. Feingold, et al., "Folder Management On A Multimodality PACS Display Station," SPIE vol. 1446 Medical Imaging V: PACS Design & Eval. (1991), pp. 211–21.

F.J. Reardon, et al., "Image Acquisition Unit For The Mayo/IBM PACS Project," SPIE vol. 1446 Medical Imaging V: PACS Design & Eval. (1991), pp. 481–491.

R. Glicksman, et al., "Architecture Of A High Performance PACS Based On A Shared File System," SPIE vol. 1654 Medical Imaging VI: PACS Design & Eval. (1992 pp. 158–168.

RFP DAC87–90–R–0058, U.S. Army, Paragraph 3.2.

FIG. 1

STRESS LINES ANGLE = 43.0 DEGREES

CERVICAL LORDOSIS = 40.0 DEGREES

FIG. 10A
FIG. 10B
CERVICAL LORDOSIS (Angle of the Cervical Curve, Cervical Angle)
 PATIENT
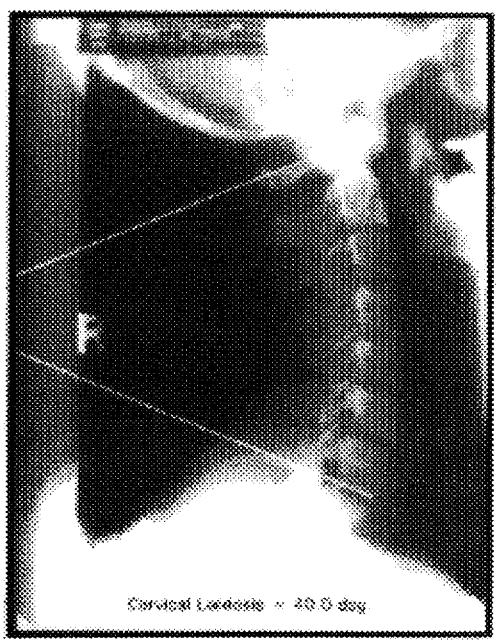 COMPARATIVE STANDARD
FIG. 10C
FIG. 10D
STRESS LINES of the CERVICAL SPINE (Ruth Jackson's Lines)
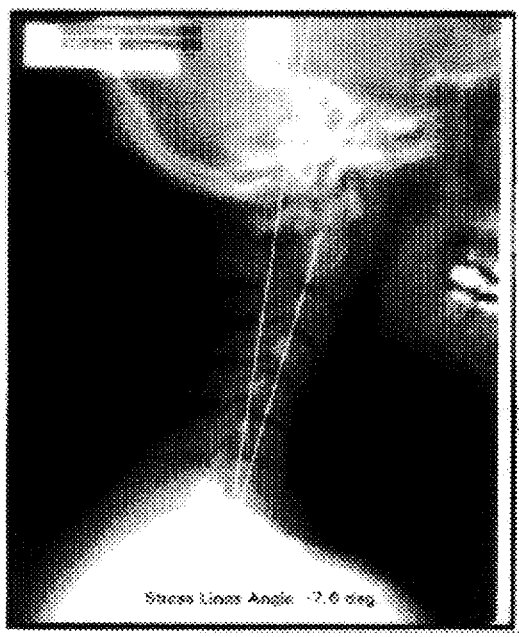 PATIENT
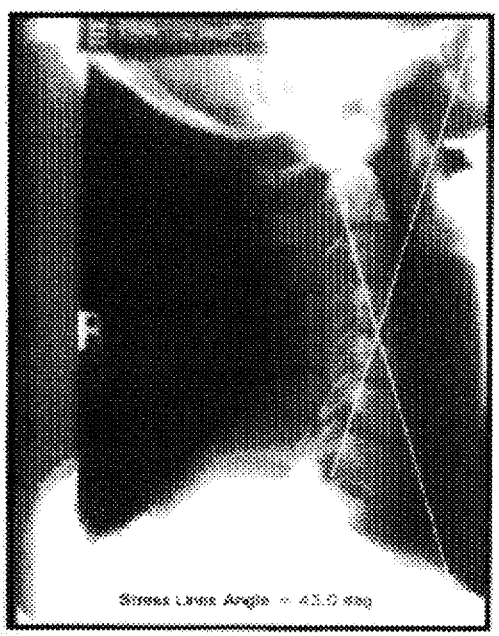 COMPARATIVE STANDARD

RADIOGRAPHIC IMAGE ENHANCEMENT COMPARISON AND STORAGE REQUIREMENT REDUCTION SYSTEM

This is a continuation-in-part application of Ser. No. 08/047,261, filed Apr. 13, 1993, now U.S. Pat. No. 5,384,862 issued Jan. 24, 1995, which is a continuation-in-part application of Ser. No. 07/891,406 filed May 29, 1992, now U.S. Pat. No. 5,272,760 issued Dec. 21, 1993. These specifications are incorporated herein in their entirety by reference.

BACKGROUND OF THE INVENTION

FIELD OF INVENTION AND RELATED APPLICATIONS

The present invention relates to an apparatus for acquiring a radiographic image, enhancing the image and extracting useful data from the image, and storing the enhancements and data such that relationships of objects represented in the image, or in other images, can be determined. In particular, the present invention relates to analysis and diagnosis of x-rays for such applications as chiropractic.

DISCUSSION OF BACKGROUND

Computer analysis of x-rays is certainly not unknown. Computer analysis and even diagnoses of x-rays using various enhancement techniques have been used for a number of years, and enhancement techniques, especially, have been developed to a considerable degree.

For example, U.S. Pat. No. 4,437,161, issued to Anderson, describes a medical imaging apparatus for initiating storage of radiological images when the images are sufficiently different from a reference image. A reference image is stored in a digital memory, the patient ingests a contrast medium or tracer, and subsequent images are taken over a period of time. Different images are formed by subtracting the reference image from the subsequent images, and scanned to determine the number of pixels having intensities above a threshold value. If the number of such pixels reaches a certain value, subsequent images are recorded. A mask can be used to highlight a smaller region of interest in the overall image (Col. 9, line 61+). The subsequent images are recorded, but not enhanced per se (except in the sense that certain features are highlighted by the contrast medium).

Grenier, et al. (U.S. Pat. No. 5,079,698) disclose a method and apparatus for digitally enhancing images of transilluminated breast tissues. A breast is transilluminated with light, the transmitted light signal is detected by a video camera, digitized, stored in a frame buffer memory, read into a computer memory and normalized on a line by line basis. The normalized image is transferred back to the frame buffer memory and displayed on a video monitor. The original and normalized images may be displayed on the same monitor (Col. 12, lines 23–27). Patient data, including the original image, are stored on an optical disc drive (Col. 8, lines 54–56; Col. 17, lines 9–13 and 27–35). Software is available for restoring the normalized image to its original form and for saving the image in either the patient data base or working storage (Col. 17, lines 36–39).

Mori, in U.S. Pat. No. 4,858,129, describes an x-ray CT apparatus for observing changes occurring over a period of time. The apparatus obtains a plurality of dynamic tomographic images by repeatedly photographing a region of interest and storing the images in a memory for subsequent display. The original tomographic data are stored on a computer; the selected time-series data are stored in an image memory separate from the area where the original data are stored (Col. 3, lines 17–22).

Kellar, et al. (U.S. Pat. No. 4,777,598) disclose a processing system and method for producing and manipulating images of a three-dimensional object. Data representing a series of parallel planes of the object ("cameos") are stored. When an output image showing the effect of a change in orientation or position of the object is required, the cameos are accessed and manipulated to produce the desired output image. The manipulated cameo data are stored temporarily in a frame store or buffer (Col. 4, lines 67+).

Sievenpiper (U.S. Pat. No. 4,731,865) shows a two-step smoothing process for digital image correction, wherein the original image data are processed to produce a "smoothed brightness map." The original image is then multiplied by the inverse of the brightness map to produce a corrected image. The original image may be transmitted without change for storage or display; the corrected image may be displayed or stored (see Col. 7, lines 57–66; downward arrows on FIG. 2).

Naparstek (U.S. Pat. No. 4,217,641) describes a method and apparatus for correcting polychromatic distortion of CT images produced by the nonlinear interaction of body constituents with a polychromatic x-ray beam. An error image is determined based on information extracted from the original image, and subtracted from the original image to obtain a corrected image. Both the original, raw image and the corrected image are stored (see FIG. 2; Col. 4, lines 53–56; Col. 7, lines 2–5).

Several image-enhancement techniques are described in these references. Grenier, et al. use Gaussian curve fitting, geometric mean smoothing, arithmetic mean smoothing, edge detection, and highlighting areas of potential cyst sites; Sievenpiper describes a two-step smoothing process; and Naparstek processes a CT image to correct polychromatic distortion. In addition, the '760 patent teaches the use of zooming, brightness and contrast enhancements, and histogram equalization (Col. 6, line 50+). Also, see E. Feingold, et al., "Folder Management on a Multimodality PACS Display Station," *SPIE Vol. 1446 Medical Imaging V: PACS Design and Evaluation* (1991), pp. 211–216, for a description of software that allows the user to perform spatial and grayscale manipulation on stored images.

Hunold (U.S. Pat. No. 4,875,225) marks x-ray images to position the x-ray diaphragm plates relative to the central beam. Other references also describe a variety of radiological image-enhancement techniques. To briefly review of few, Nakajima (U.S. Pat. No. 5,086,392) displays an image next to a previously-stored image of the same object for comparison purposes; Shigyo, et al. (U.S. Pat. No. 5,077,768) detects and removes faults in a system for a radiation image processing; Funahashi, et al. (U.S. Pat. No. 4,999,497) process images for high contrast and sharpness; Nishiki (U.S. Pat. No. 5,038,369) digitizes an x-ray image and subtracts an offset signal from the image signal; and Daniels (U.S. Pat. No. 4,160,906) teach a user-controllable programmer for diagnostic x-ray apparatus that allows the user to select the portion of the body to be x-rayed and displays the exposure parameters for the particular anatomical region. Kimura (U.S. Pat. No. 4,641,242) adjusts the conditions of exposure to radiation and the image processing conditions to the most suitable conditions in a single step, and "marks" the images with a patient ID code. Inouye, et al. (U.S. Pat. No. 4,189,775) enhance images by applying a filter function to projection data of an object. The apparatus includes a computer for storing the original projection data and a "reconstructed-memory" section for storing the filtered projection data (Col. 4, lines 40–52). Takeo (U.S. Pat. No. 5,169,597), teaches a method for determining an image point in an object image; Eberhard, et al. (U.S. Pat. No. 4,920,491) reconstruct incomplete images in non-destructive evaluation by utilization of a priori information (electronic models derived from solid models of a part to be imaged, the physics of the inspection process, and outputs of touch and other sensors); Morishita, et al. (U.S. Pat. No. 5,150,421) have automated transformation of the gray level of an image using histogram equalization; Ito, et al. (U.S. Pat. No. 5,172,418) store names of various diseases and optimum image processing conditions for the respective diseases; Manian (U.S. Pat. No. 5,172,419) process medical images in a system including a controller that analyzes digitized image data and computes an exposure correction factor; and Ajewole, et al. (U.S. Pat. No. 5,046,118) enhance digital representation of radiographs where the enhancements become part of the image.

Scanners, in particular, have been the subject of improvements. See, for example, the three patents issued to Nicols, et al., describing teleradiology systems for compressing/expanding digitized images (U.S. Pat. Nos. 4,860,112; 4,748,511; 4,910,609). The systems scan x-ray images and transmit the scanned images to various locations. The scanned images are stored in an expanded or compressed form for later call-up in a hard disk that may be configured to store raw images only, compressed images only, or a combination of both (see '112, Col. 3, lines 63–64). In addition, the system can process alphanumeric character information (such as patient ID information) for display on the monitor ('112, Col. 8, lines 45–50).

Color processing of images is the subject of three patents owned by (Nagler, et al., U.S. Pat. No. 5,247,352; Bachar, U.S. Pat. No. 5,111,308; and Israeli, et al., U.S. Pat. No. 5,122,871). Nagler, et al. disclose an apparatus and method for improving color images that have a multiplicity of color separation signals resulting from one or more detail enhancement methods. Bachar and Israeli, et al. scan a picture while making desired adjustments to the scanned image prior to storing the image. The Bachar method includes pre-scanning the picture, displaying the image on a monitor, making the necessary adjustments, via physical rotation or computer computations of the image, and then re-scanning the image in the desired orientation or layout. The Israeli patent describes geometric manipulation of a pre-scanned image, rather than marking and physically rotating the image.

Siemens provide a system that specifies a radiological imaging system that preserves the acquired image, with user-modifiable image processing protocols including mensuration, text annotation and graphic annotation. In this system, the user can move, orient, resize, annotate and take critical measurements on displayed images (R. Glicksman, et al., "Architecture of a High Performance PACS Based on a Shared File System", *SPIE Vol. 1654 Medical Imaging VI: PACS Design and Evaluation* (1992), pp. 158–168; see p. 161, last paragraph in Section 4).

However, none of the foregoing focuses specifically on the separate storage of enhancements from the image to save computer space or marking a monitor-displayed copy of the original image with the enhancements as an overlay. None describes the storage of the original image in an unmodifiable way. There remains a need for a computer analytical and diagnostic system and method that includes these important features.

SUMMARY OF THE INVENTION

According to its major aspects and broadly stated, the present invention is a method and system for performing certain analyses on radiographs. The system includes a general purpose computer with a central processing unit, a monitor, a hard disk, and various input devices, including a scanner, and a printer. The central processing unit controls the system, including the scanner. In one embodiment, an x-ray is scanned in,to the system using the scanner that produces a digital image. This image is stored in permanent storage in such a way that it cannot be modified, although a copy is made for display on the monitor and is temporarily stored in random access memory, and lost when the computer is turned off. Once an image is displayed, the system is then available to the user to perform an analysis of the image. The analysis, either manual or automatic or both, begins with an enhancement of the displayed image, includes zooming in on a desired portion of the image and marking the image with landmarks and lines of interest between landmarks for analysis of the relationships between the landmarks and lines. These enhancements are stored separately from the unmodified image so that, when a user wants to see the enhanced image, the original, unenhanced image is processed each time, but the large amount of space required for storage of an enhanced image is avoided.

An important feature of the present invention is the storage of the enhancements separate from the unenhanced image. As will be explained presently, the enhancements require only about 1/3800th the computer storage space of the enhanced image. Because computer processing time is very short, re-processing an unenhanced image each time a user wants to see one is not a serious factor. Furthermore, because the original digital image is not modifiable, it remains available as an important record for insurance or legal purposes. In fact, the entire enhancement routine sequence is repeated and repeatable so that no step is lost.

Automated analysis is another important feature of the present invention. Automated analysis assures that the analysis is not only done quickly, but completely and consistently each time. Having the capability to perform a manual analysis assures that flexibility exists when needed.

BRIEF DESCRIPTION OF THE DRAWINGS

In the drawings,

FIG. 1 illustrates a photograph of an example of an image displayed on a monitor according to a preferred embodiment of the present invention, where a lumbar anterior/posterior x-ray is displayed on the left, a "zoomed" view of the same X-ray is displayed on the right and various administrative information is displayed above these views;

FIGS. 10a–10d represent photographs of four different analyses of the same image.

DETAILED DESCRIPTION OF A PREFERRED EMBODIMENT

Figure 9:
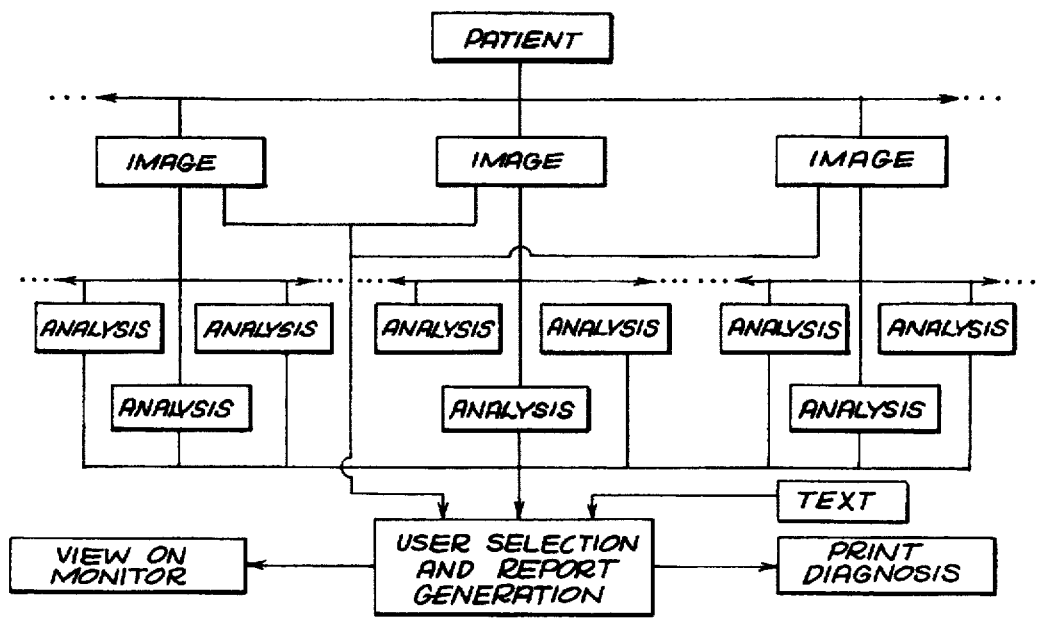
FIG. 9 is a flow chart showing the relationship of the data hierarchy to the data access modules.

An "image" can be acquired from many sources. The present invention will be described in terms of existing x-ray films that are scanned by a scanner or recorded with a video camera system. This system currently uses spinal x-rays. However, x-ray images of other parts of the body are also easily used, including dental x-rays. Additionally, images can be downloaded from other systems, including computerized tomography (CT), magnetic resonance imaging (MRI), nuclear medicine, mammography, quality assurance machine vision, ultrasound, scanned photograph, digitized video, radar, digital x-ray, electronic endoscope, angiography and any other type of imaging system that is digitally recorded for the propose of diagnostics or decision making.

There exist Picture Archiving and Communication Systems (PACS) that are specifically designed to handle the flow of images. PACS systems are relatively new, yet common in the radiology industry. Additionally, the National Electrical Manufacturer's Association (NEMA) has developed the Digital Imaging Communications (DICOM) standard, which prescribes preferred data transfer protocols to enable a large variety of digital systems to communicate. These systems allow preferred embodiments of the present invention to receive different images from many sources, which are then automatically converted into the data formats that are compatible with the internal operations of the system.

Moreover, inasmuch as the preferred embodiments are based on analysis of two dimensional images (using an X and Y coordinate system), the present invention is readily adapted to accommodate additional dimensions such as depth (Z) and time (T) for a comparative image analysis across space and time.

The two dimensional system is useful for comparing one image against a known reference or standard. Comparison may show how a patient's condition differs from his own previous condition or that of a relatively healthy person. A similar comparison may be made of the same patient's condition using before/after images to show the effectiveness (or lack of effectiveness) of treatment over time.

A third type of comparison can show movement within a series of images such as determining intersegmental vertebral motion of the cervical spine when images are taken in the flexion, neutral and then extension positions.

Another comparison system that works well is a multiple-camera, synchronous, real-time, video measurement system. Multiple cameras, used to capture the three spatial dimensions, can show changes in the subject over time. The changes identified from image to image can be used to correlate the subject data with known data to pinpoint abnormalities in the subject.

Regardless of the source of the image, the content of the image, the quality of the image, or the relationship between images, the original digital image forms a control data set that should be retained and preserved in the exact state received. Unless the image is obtained from an MRI or like system where the image is digital from inception, the making of the electronic copy—the digital image—from an x-ray film by use of a scanner or camera degrades the image to some degree. The degree of image degradation depends on a number of factors including scanner/camera resolution, the range of colors available when reproducing the image, the quality of lenses used, the quality and trueness of the photo cells in the scanner/camera, the optical density range of the scanner/camera, the contrast of the subject or the quality of the original film, lighting, and other factors. The existence of dust on the camera lens filters data from the electronic image of the original. Even under perfect conditions we can still assume that entropy results in data loss, at least to some small degree when copying the original. For these reasons we must preserve the original image, imperfect as it may be, in the exact form received.

As the requirements within the medical community for quality and definition of a "diagnostic quality image" increase, there is a continuing tension between image size (the larger the better) and image storage requirements. As an example, if a standard 14"×17" x-ray film is scanned at 75 dots per inch at 8 bits (256 colors or shades of gray) the resulting data file would be 75×75×14×17=1,338,750 bytes long (approximately 1.3 Meg). By most standards of computing this is a large file. However, it is simply not large enough to be of good diagnostic quality.

When the scanning resolution is increased to 200 dots per inch and we then increase the number of colors to 16 bits (65,536 colors), we get 200×200×14×17×2=19,040,000 (19 Meg) for a single image file. Not only is a file of this size difficult to manage and expensive to store, it is also cumbersome to manipulate and analyze by even the fastest of modem CPUs.

Feasibility and reality lie somewhere between these two extremes. Of course, as computer storage space becomes less expensive, storage of better quality images becomes more feasible and realistic. However, it must be remembered that the foregoing example just describes the storage requirement for the original electronic image—with no enhancements and no analytical data extracted therefrom.

Figure 7:
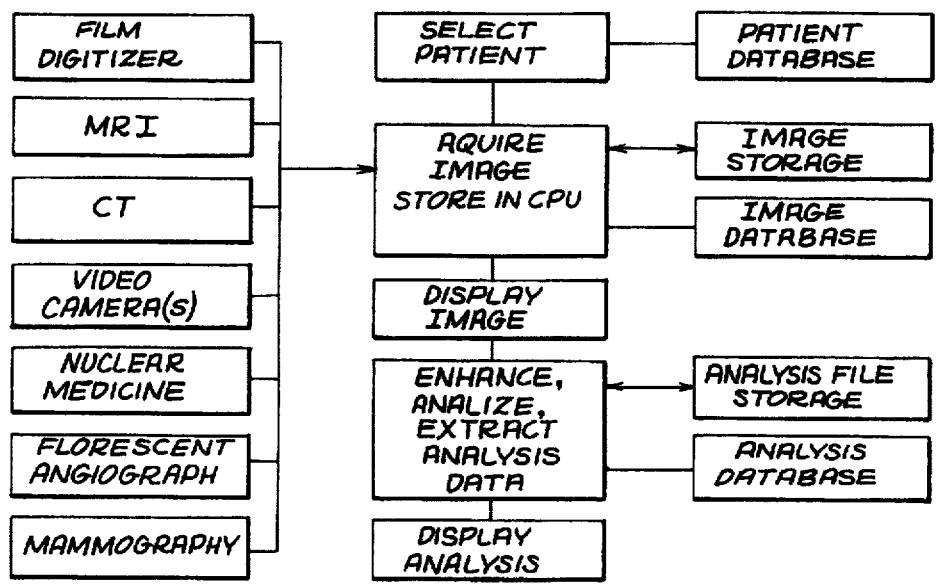
FIG. 7 is a flow chart showing the relationships between various sources of input and input management.

The acquisition and input of images is illustrated in FIG. 7. When an image is acquired, it is stored in two places. First, as the image is acquired, it is retained in the central processing unit's (CPU's) temporary random access memory (RAM) in such a location and format that it can also be displayed on the CPU's monitor. Secondly, the same image is simultaneously saved to a storage device, such as a hard disk, mass storage array or other available means for storing digital data received from a CPU. This is the permanent image that cannot be modified because, by design, no programming is provided to modify it. The user also has no means by which to delete this image. Also, both storage means, RAM and storage device, although different, are electronic in nature.

The image is mapped to a two dimensional Cartesian coordinate system. For example, when an image is mapped to an array having the dimensions 1000×1500 pixels, the pixel in the upper left corner of the image is numbered 0,0, the pixel in the lower left corner of the image is numbered 0,1500 , and the pixel in the lower right corner is numbered 1000,1500. These coordinates correspond to a two dimensional Cartesian coordinate system. Using this system all image point locations can then be characterized by their spatial relation to other points on the image. This type of mapping combined with a means of recording the "color" of each pixel of the image is typical and common among numerous existing image formats.

The system also has a number of databases that track and relate required information. Specifically, there are databases for Patient data, Image data, Analysis Data, Report Data, Counters, Doctor Information, User Information, Passwords, Report Configurations, and Analysis Configurations, as well as other support databases.

The ability to coordinate the image and its attributes is necessary in order to manage and analyze the image. As shown in FIG. 9, the image data is structured as follows: Patients have images. Images have analyses. Reports have combinations of Images, Analyses and Text.

All of a patient's personal data is stored in the Patient Database. The patient is given a unique Patient Number when that patient's data is entered into the Patient Database. The Patient Number has two parts. One part is serially generated from the Counters Database. The second part comes from the system identifier, so that the patient number is unique regardless of how or when the image and data may be passed to other systems later.

The invention, in its preferred embodiment, scans an existing x-ray film to acquire an image. As indicated above and illustrated in FIG. 7, other image sources can be used to obtain images, including dental x-rays, MRI, CT, nuclear medicine, mammogram, ultrasound, scanned photograph, digitized video, radar, digital x-my, electronic endoscope, and angiographic systems—in short, any other type of image source wherein the image is recorded digitally for the purpose of diagnostics or decision making.

Before an image is scanned, the user must first either identify the patient from the existing Patient Database or add the patient to the existing Patient Database (see FIG. 7). The user is then prompted by the system for attributes and descriptive data of the image, including the film dimensions, film date, film source, the resolution desired, and the view of the film. For example, in chiropractic x-ray films, the film view may be a cervical, thoracic or lumbar (either anterior to posterior or lateral view), a flexion or extension view, as well as an oblique view. Means of entering; a specific description and notes about the image content is provided if the standard, programmed information does not apply.

In order to relate film views and to allow the CPU to differentiate the contents of different images, a numbering system has been established such that each image is given a unique ScanType variable. The ScanType variable is stored in the Image Database and is used to assist in determining the content of the image and all of that image's available analyses. Using chiropractic x-ray film views, the following is an example of ScanType variables that are assigned to Film Views.

| Film View | ScanType Variable |
| --- | --- |
| Cervical Lateral Neutral - digitized film | 1 |
| Cervical Lateral Flexion - digitized film | 2 |
| Cervical Lateral Extension - digitized film | 3 |
| Cervical Anterior to Posterior (A/P) - digitized film | 4 |
| Cervical A/P - Open Mouth - digitized film | 5 |
| Cervical A/P - Left Flexion - digitized film | 6 |
| Cervical A/P - Right Flexion - digitized film | 7 |
| Cervical Left Oblique - digitized film | 8 |
| Cervical Right Oblique - digitized film | 9 |

A similar list would be constructed for the thoracic, lumbar and extremities until all possible views of interest are included and assigned a unique ScanType variable. The designation of the ScanType variable is arbitrary, so long as like images are always assigned a like ScanType once the correspondence between the Scan Type variables and the film type is initially set up.

This type of image tagging system extends readily to other types of image analysis as well. The value of this tagging system will be described in detail and used when the Analysis Files of multiple images are compared. The ScanType also varies from one image format to the next. A cervical lateral digitized film has a different ScanType than a cervical lateral MRI image.

After the patient has been identified and the image has been completely identified, the CPU passes the image parameters to the scanner or video camera, and the user is instructed to place the x-ray film on the scanner bed or on the camera lightbox and then to press the SCAN button. The scanner or video camera then retrieves the scanned image and, as stated above, stores it in RAM memory for instant display on the monitor.

Alternatively, using other types of image generation systems, this digital image acquisition function is performed by means of importing the image from an MRI unit or other electronic imaging systems.

Once obtained and displayed, the image is given a unique filename which, just as with the patient number, is partially and serially generated from the Counters Database, as well as partially named with a system identifier, so that the image filename is unique regardless of how or when the image may be passed to other systems later.

Basic image attributes (resolution, original film size, number of pixels in the x and y directions), ScanType, image filename and patient number are then saved to the Image Database. The image variable in the Counters Database is then indexed sequentially. The image file is then stored with the other previously collected images in the storage device, i.e., hard disk.

Figure 1:
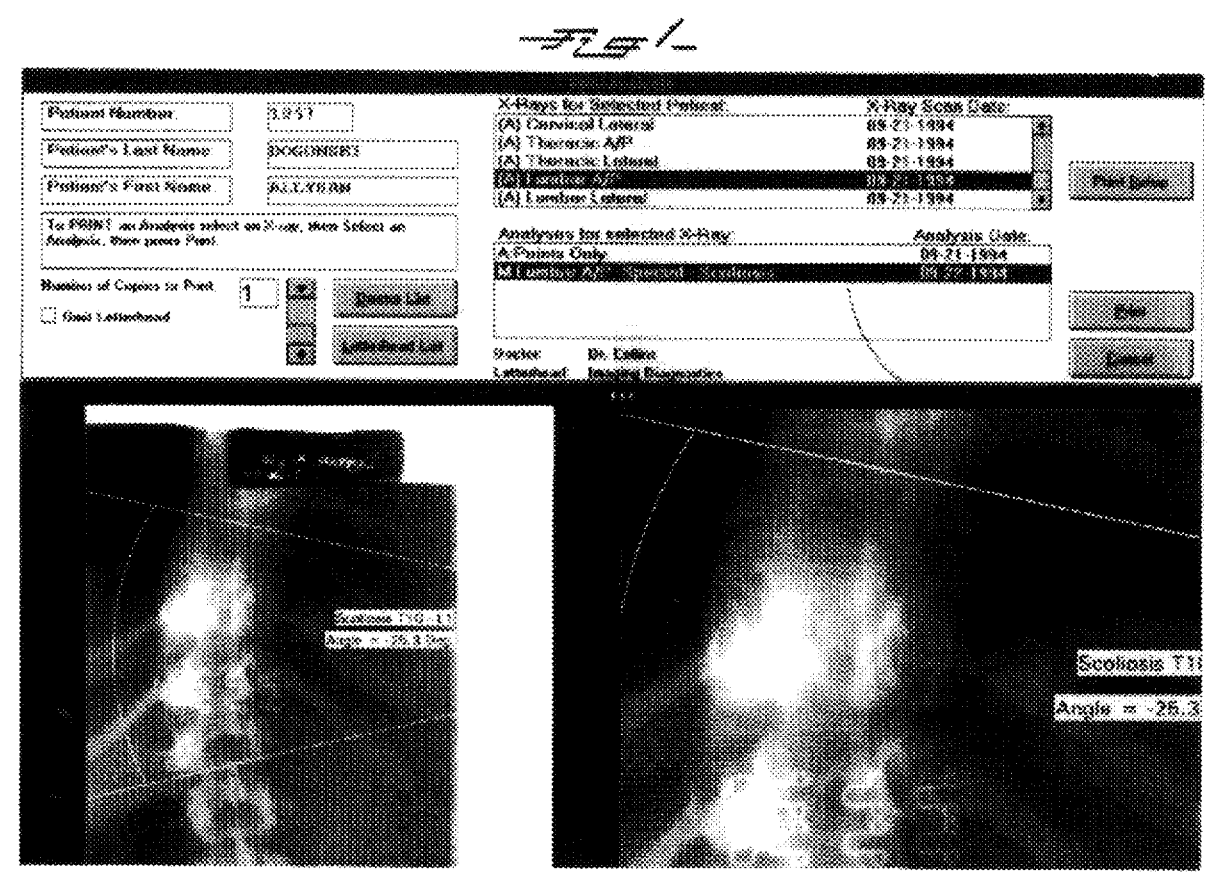
Figure 8:
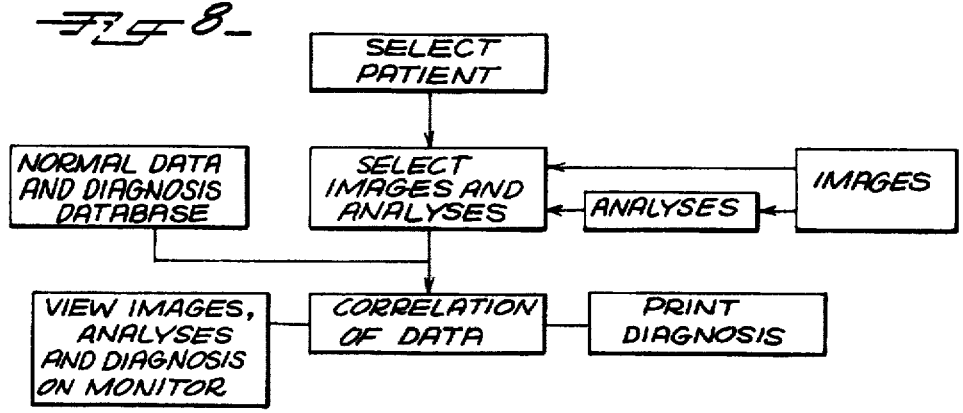
FIG. 8 is a flow chart showing the management of output preparation.

Using this system, the user can select an existing patient from a list of patients in the Patient Database and then select an image to view from a list of images of that patient taken from the Image Database and sorted by the field of user preference (see FIG. 8). Using readily available software and database management programs, the "tree" of lists stemming from multiple databases is easily displayed and manipulated using standard computer interfacing hardware, such as a computer mouse, a light pen or a keyboard. The desired image is selected from the patient's list of available images by indicating—"clicking" on—its description. The system automatically retrieves the image filename from the Image Database and then retrieves a copy of the image from permanent storage back into RAM memory, where it is displayed on the monitor. Using this system, the user can browse through all of a patient's images by simply clicking through the descriptions extracted from the Image Database for that patient, as shown in the list box in the upper right corner of FIG. 1.

Thus far, it is assumed that the images are displayed exactly as received by the system when scanned or imported. However, there may be one or more different modifications, enhancements, extractions, and manipulations that the user may wish to make to an image, including:

1. adding text
2. making labels
3. drawing arrows
4. contrast adjustments
5. brightness adjustments
6. local histogram equalization 7. global histogram equalization
8. zoom in
8. zoom out
10. pan
11. mark a landmark (point)
12. mark a series of landmarks (points)
13. measure distances
14. draw lines
15. measure angles
16. measure circumferences and radii
17. measure areas
18. measure change in image density over a distance or area
19. fill in an area with color Additionally, the user may wish to identify landmarks (points) or a series of landmarks (multiple points) that in certain sequences determine a number of different relationships between features. These relationships can be correlated to known relationships in other reference images to determine whether the relationships in the patient's images are normal or abnormal.

The present invention allows for any combination of the above-listed enhancements, modifications and extractions to be applied to a given image without ever actually changing the original image data and, most importantly, without saving a second image. A long list of operations can be performed on an image that is stored in "virtual" memory without modifying the original data. With this system, a list of operations performed on an image is referred to as an "analysis" and the data from an analysis is stored in an Analysis File. The list of operations comprising the analysis are stored in both CPU memory and, in an ASCII text format, on disk, so that various programs may access the analysis information dynamically.

Regardless of whether an Analysis File is obtained from an automatic analysis or manual analysis process, the analysis data that is stored in an Analysis File may simply contain image enhancement features such as brightness, contrast, histogram equalization, zoom, gamma correction factors, and other image adjustment instructions. The Analysis File may also contain landmark point data that has been extracted. Additionally, the Analysis File may contain combinations of enhancements and landmark point data. The Analysis File is structured so that it may vary in size and content depending on the specific non the specific need that the user has in mind when performing the analysis.

It is also possible to have the Analysis File "attached" to the image file. Although this is not done with the current embodiment, there may be economies of scale that result from creating a new image file format that can hold the Analysis Files in the same computer data file that contains the image itself. This would insure that the Analysis Files are never separated from the image.

When performing an analysis (including calculations and enhancements) on an image, a portion of the monitor is used to display the image manipulation controls, another portion of the monitor is used to display the entire extents of the image (System Zoom image) and yet another portion of the display is used to display the image when and if zoomed by the user (User Zoom image). An example of a monitor image is shown in the lower left corner of FIG. 1, where a thoracic anterior/posterior x-ray has been selected.

Once a patient and an image are selected, the image can be analyzed in both automatic and manual modes. To perform an analysis, an image is loaded from permanent storage into a location in RAM memory and simultaneously displayed on the monitor. In a preferred embodiment, a variety of "soft" controls (buttons, slides, and adjustment tools created using software and operated with a mouse) are displayed on one portion of a monitor, while the image is displayed on another portion of the monitor. Alternatively, dual monitors may be used to display the image and the soft controls. Still another alternative embodiment is to use external, hardwired analog control circuits and a single monitor used to display the image.

As the analysis is made, the changes to the image are not made to the original image (because it is stored in an unchangeable form on hard disk); they are made only as an overlay on the image that is in RAM memory, and thus the results are immediately visible on the monitor. The exact parameters of the analysis are also stored in a second RAM memory location separate from the image. Additionally, the parameters are also written to a temporary file on disk in ASCII text format. The parameters differ depending on the enhancement or data extraction operation performed. However, each enhancement is similar in that each is a set of instructions needed to create, and later recreate, every operation performed on the image that is in virtual memory.

The Analysis File contains the data for everything done to and extracted from the image, including all information needed to recreate the analysis exactly as it was performed by the user, saved for later use.

It is important to note that an analysis and the corresponding Analysis File of an analyzed image may include any combination of enhancements or data extraction. For example, one analysis may be a zoomed area of a particular vertebra. Another analysis may be merely a label and an arrow pointing to a particular problem. Still another analysis may include landmark data from an Automatic Analysis (no image enhancements at all) to be used later for report generation.

After the image has been analyzed, the analysis data (the instruction set of what has been done to an image but not the image itself) is sorted and saved as an Analysis File. Consequently, the Analysis File is quite small in comparison to the size of the original image. A large Analysis File may be only 5 kilobytes in size. Saving the Analysis File without creating another image results in space savings of 3800 to 1.

The Analysis File is given a unique filename which, just as the patient number and image filename, is partially and serially generated from the Counters Database, as well as partially named with a system identifier so that the analysis filename is unique regardless of how or when the image may be passed to other systems later. The analysis is given a description, and then a reference is added to the Analysis Database to correlate it to the Analysis File so that the analysis data may be easily retrieved later.

In order to view a previously performed Analysis, the user first selects the patient from the list of all patients. Two lists then appear on the monitor; the first is a list of images for that patient. The second list is blank until an image is selected from the first list. From the first list, the user then selects an image from all available images of that patient. These images are the original data that was first received by the system or scanned. When an image is selected from the first list, that image is loaded into RAM, displayed on the monitor and then descriptions of all previously performed analyses for that image are retrieved from the data based and placed on the second list. When an analysis is selected from the second list, the Analysis Database references the appropriate Analysis File and those instructions are applied to the image that resides in RAM memory only. The analysis and the enhanced image are recreated; there is no need for the existence of a permanently stored enhanced image. To this extent, the Analysis File is a macro that has been tailored specifically for this image and that can be recalled all any time. (see FIGS. 1 and 6)

If another analysis is selected, the original image is again recalled from permanent storage and the next Analysis File instructions are applied to it. If a different image is selected, that image is recalled from permanent storage and displayed on the monitor. Again, once an image is selected from the first list, that image's Analysis Files are listed from the Analysis Database in the second file list box, as can be seen in FIG. 1.

It will be clear that the present method trades storage space for processing: an image is stored in one location and enhancements to the image are stored in another location without saving a second image that includes the enhancements. This approach saves space but requires a re-application of the enhancements to the copy of the original image each time it is summoned. However, to the user there appears to be multiple images just as if each was saved; but in reality each analysis is a virtual manipualation of the original image. Subject to storage space and database limitations, a patient can have a large number of images and each image can have a large number of analyses (FIG. 9).

The process of applying the instructions from an Analysis File to the image stored in CPU virtual memory, illustrated in FIGS. 8 and 9, is just as simple to do as when printing the images. The image is retrieved, enhanced with an Analysis File and then printed. When the next image is loaded, the previous image and all previous analysis data stored in CPU memory are overwritten by the new data and destroyed. When printing reports, a temporary print file is created that holds all report data as the report is being built. Once all selected images, analyses and texts are generated and added to the print file, the print file is sent to the printer and the CPU memory is cleared to begin another image viewing operation. (see FIGS. 8 and 9.)

The display layout on the monitor is divided into three distinct areas: (1) Data Operations and Control Area located across the top of the monitor; (2) the System Zoom Image display area on the lower left side of the monitor; and (3) the User Zoom Image display area on the lower right side of the monitor. (See FIG. 1, lower right and left images.) System Zoom and User Zoom are distinctly different and both are necessary to enable the system to display and analyze a large variety of image sizes.

System Zoom is needed to display the full dimensional extents of the image as received by the system. It also allows a variety of image sizes and resolutions to be displayed easily on a single monitor of fixed size and resolution. In order to display an entire image dimensionally (an example would be a 14×17 inch film scanned at 200 dpi that needs to be displayed on a portion of the monitor screen that has only 200×300 pixels), some percentage of pixels need to be systematically skipped by the monitor. The ratio of the number of image pixels displayed to the total number of image pixels actually available within the range is the System Zoom magnitude, and is stored as a numeric value. The calculation of this ratio, performed independently of any action on the part of the user, is based on the original image resolution and the physical dimensions of the original image as compared to the limitations of the monitor.

Figure 2:
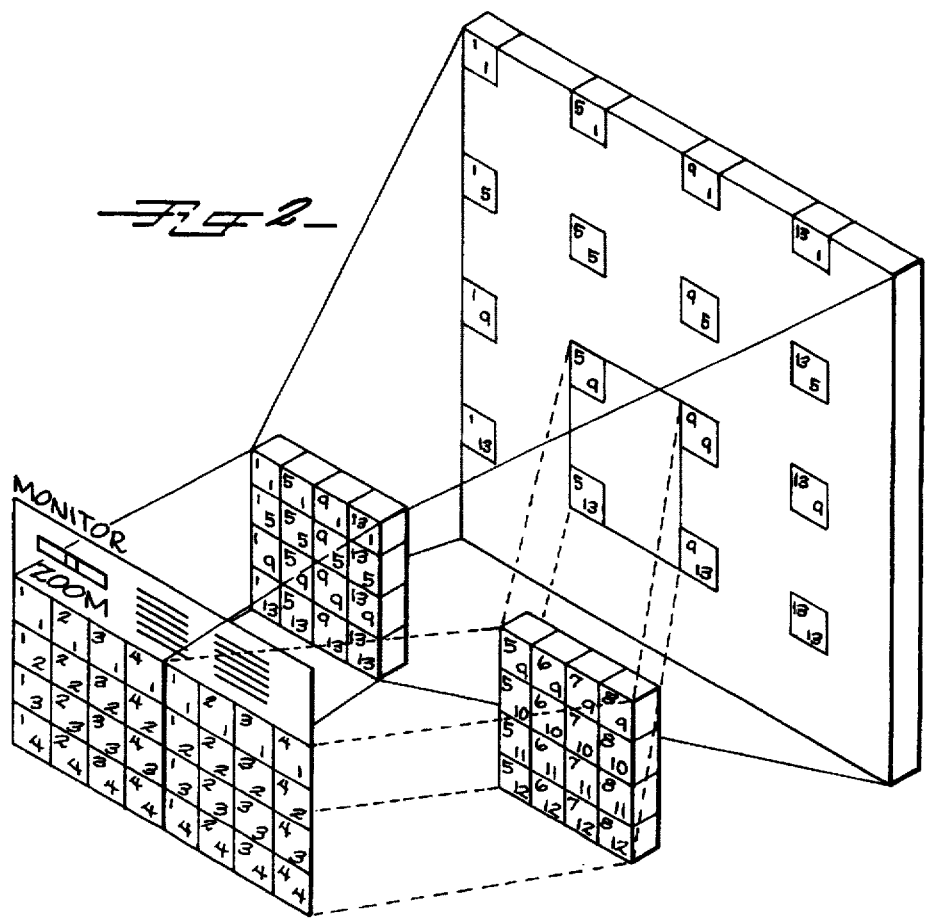
FIG. 2 is a schematic showing the relationship of the System Zoom and the User Zoom to the Image.

The System Zoom calculation is needed to construct a map that relates each pixel in the System Zoomed image to each pixel in the 1:1 actual image as stored on disk. Each time a point is marked on the displayed image the System Zoom map is referenced and the coordinates reported are extracted from the full sized image, as illustrated in FIG. 2.

The System Zoom can be thought of as "zooming out." System Zoom results in a temporary loss of detail that is directly proportional to the square root of the difference between the actual image pixels used and the number of pixels available from the monitor display.

If the user decides to zoom in on a specific area of interest on the displayed System Zoom image, he uses the User Zoom feature to display pixels that were not previously visible. When the User Zoom slide bar control is moved from 0 (User Zoom Off) to 1 (User Zoom ,On), an image appears on the lower right side of the monitor that is the duplicate of the System Zoom image. Initially, the "User Zoom-ed" image on the right appears exactly the same as the displayed System Zoom image on the left, because the User Zoom setting multiplier of 1 does not change the image magnification. However, once the slide bar is pushed past the zoom setting of 1, the User Zoomed image on the lower right side of the monitor will zoom in on the desired portion of the image.

The area zoomed is initially the upper left corner of the System Zoom image; however, by simultaneously holding down the left mouse button and sliding the mouse while the cursor is positioned on the System Zoom image, the User Zoom image pans across the System Zoom image. This technique allows the user to see both the entire System Zoomed image and a portion of the User Zoomed image areas simultaneously.

Once the User Zoom is activated, continued manipulation of the User Zoom slide bar interactively zooms in and zooms out on the image.

The CPU continually reports the degree of User Zoom (the position of the User Zoom slide bar) and the X and Y coordinates of the center points of the zoom focus. When an analysis is completed and saved, and if the User Zoom has been set, the user is prompted as to whether the User Zoom should be left "on" or turned "off." If the User Zoom is left "on," the amount of zoom and the X and Y coordinates of the center of the zoomed image are saved in the Analysis File so that the User Zoom can be recreated.

Additionally, regardless of which of the two displayed images the cursor is placed on, cross-hairs appear on the closest corresponding pixel on the opposite image to help identify specific locations and landmarks when comparing System Zoom images with User Zoom images.

Although there are usually more image pixels available than the monitor pixels can display, the User Zoom can actually be adjusted high enough to allow for the image to "pixilate." Pixelation occurs when the User Zoom is increased to and/or beyond the point that pixels can be displayed at a one to one ratio. When this happens two or more "monitor pixels" may be used to display a single "image pixel." When this happens, both of the monitor pixels have the same map coordinates that correspond to the pixel in the original image that they represent.

The map created tracks and relates the X and Y coordinates of the System Zoomed and User Zoomed images with the coordinates of the original image. A pixel of the original image is considered to be fixed in physical size, and all calculations must relate back to the original image, using a scale factor, regardless of what is displayed on the monitor. The relationship of each monitor pixel to the actual image pixel and the use of zoom functions are very important when tracking calculations.

This mapping function also indicates that when selecting points during the analysis of an image, the System Zoom area is less accurate than the User Zoom area, because more pixels of a specific area are displayed on the User Zoom image. Therefore, it is best to zoom in on an area when selecting landmark point locations. In fact, the highest possible accuracy of the image is a simple function of the resolution of the image, the System Zoom amount and the lowest User Zoom amount used to select any one point in the Analysis. Although this approach does not account for user error or error inherent in the original image, it does provide a quantified minimum error in dimensionless units of mm per mm and/or pixels per pixel.

Manual Analysis is used for specific image manipulation and is not highly structured or systematic. Rather, it is designed to provide flexibility when performing an analysis. However, it also has the least "repeatability." Manual Analysis can be used to manipulate an image in a very specific way or to highlight a specified area of an image, display it, and print a report that calls attention to that area. Unlike the Automatic Analysis, landmarks collected during a Manual Analysis are not usually used to generate multiple reports at a later time. The Manual Analysis is designed to be viewed or printed immediately as an end product. What follows is a list of enhancements and data extraction tools that are used by the system to analyze an image. Many of the tools are used by both the Automatic and Manual Analysis Modes.

When performing a Manual Analysis, there are a variety of options that usually require a request for information about the image from the CPU. For example, if the user wishes to measure a distance, two points, called "Landmarks," are required from the image across whose span the distance between those Landpoints is calculated. By pressing the "Distance" button on the Manual Analysis menu, the CPU is instructed by the user to report the coordinates of the next two consecutive points, indicated in a preferred embodiment as "clicks" of a left mouse button. The user then positions the mouse cursor on the first desired Landmark on the System Zoom image or on the User Zoom image and presses the left mouse button. The user then repositions the mouse cursor on another image location and again presses the left mouse button. Two sets of X and Y coordinates that relate back to the positions on the original image are reported by the CPU. By using the well known right angle formula and the Pythagorean theorem, the CPU determines the number of pixels that rest in a straight line between the two selected landmarks. Further, because the scale of the image is obtained from the Image Database and retained in CPU memory when an image is first loaded, simple multiplication produces the calculated distance between the two Landmarks.

Each Landmark is stored in the Analysis File using the following structure: {Point, N, X, Y}, where:

N=The consecutive landmark number requested.

X=The X coordinate of the landmark.

Y=The Y coordinate of the landmark. The distance is reported in a text box on the Analysis Menu and may be made into a Label by pressing the Make Label button.

There is no means for a distance calculation to be retained during an analysis performed in manual mode; however, calculations can be re-generated from the Landmark data saved in the Analysis File.

Additionally, in the System Setup area, the system has a "Units" button that multiplies the final result by the required factor to report the distance in either English or SI units.

The Analysis Menu contains a text box to enable the user to place information that he wants to display on the image as a Label. Pressing the "Make Label" button places information typed by the user and displayed in the text box into a Label. This function adds a small block of text as a label to the upper left corner of the System Zoom image. When a label is made, the following line is added to the Analysis File:

{Text, X, Y, 'Label data goes here in single quotes'} where

X=The X coordinate of the upper left of Label.

Y=The Y coordinate of the upper left of Label.

The Label may then be repositioned anywhere on the image using the "Move Label" button. When this button is selected, the user then clicks the mouse cursor on the Label that is to be moved. The CPU then searches the Analysis File for a Label whose coordinates are closest to those reported by the mouse click and erases that entry. The user then "drags" the label to the new location and releases the mouse button. The coordinates of the mouse cursor are again reported when the mouse is released and the CPU rewrites the Label into the Analysis File using the new coordinates. (Additionally, Label sizes are recalculated before they are displayed on the User Zoomed image so that they do not increase in size when the image is zoomed.)

In recording a landmark, there are two distinctly different pieces of information that must be saved: the landmark coordinates and the graphics that display the landmark. For this reason, all landmarks also have two entries made in the Analysis File. The first entry is retrievable raw data, and the second is display data that includes information on how to show or display the raw data. To facilitate this process, the following convention is used in the Analysis File:

{CROSS, X, Y, R, G, B, W} where

X=The X coordinate of the Landmark.

Y=The Y Coordinate of the Landmark

R=Degree of Red in Cross color.

G=Degree of Green in Cross color.

B=Degree of Blue in Cross color.

W=Width of Cross lines to be drawn.

When an analysis is re-displayed or printed, cross marks are drawn over the image that may interfere with the viewing of the image. The user has the option to instruct the CPU by selecting either "CROSS_ON" or "CROSS_OFF." This command instructs the CPU to use or ignore, respectively, the graphic representation of these landmarks on the CRT displayed image. By storing the crosses separately (and redundently), it is easy for the CPU to sort through the Analysis File at a later time and simply skip or include those lines of data. This command also applies when printing an analysis.

The Line function is similar to the Distance function except that once two coordinates are received, they are saved in the Analysis File using the following convention:

{Line_Z, X1, Y1, X2, Y2, R, G, B, W} where:

Z=Type of line to be drawn
 F=Full Line—across entire page
 P=Partial Line—just point to point
 X1=The X coordinate of the first point.

Y1=The Y Coordinate of the first point.
X2=The X coordinate of the second point.
Y2=The Y Coordinate of the second point.
R=Degree of Red in line color
G=Degree of Green in line color
B=Degree of Blue in line color
W=Width of line to be drawn.

The colors and width are obtained from the System Setup Menu and retained in CPU memory from startup. They may be changed at any time by the user.

When two mouse clicks are received for drawing a line, the Line formula is saved to the Analysis file and a line is drawn on the monitor image and displayed in both the System Zoom image and the User Zoom image (if visible).

When the user decides to measure an angle, he presses the "Measure Angle" button on the Manual Analysis Menu. The user then must click the left mouse cursor on two existing lines that have been drawn previously.

When the first mouse click is received, the CPU searches the Analysis File for the line that passes closest to the clicked point. Assuming the line is found, the CPU redraws the line in a different color (to signify to the user that a line has been found) and then retains the coordinates of the line in memory. A second line is then selected and redrawn using the same method, and the coordinates of the second line (assuming it, too, is found) are retained in memory. Basic trigonometry is used to calculate the angle between the two lines (4 coordinates) which is then written in the label text box as, for example, "Angle 1=20.1 degrees." The user may then make a label that displays this text by pressing the Make Label button, as described above. Just as with the distance calculation text, the Angle calculation text is not retained unless a label is made.

The Analysis File, if generated in Automatic Mode, is read later to use the saved Landmark point locations for making angular calculations.

The contrast range analysis function is useful for determining the range of colors encountered across a line that is drawn by the user for determining the density of a film or image. Image density and density variation can be used, for example, when determining whether a patient has diabetes when viewing images taken from fluorescent angiography images of the retina. If there is significant darkening around the center of a patient's retinal image, diabetes may exist. The user can be prompted to identify the center of the image, then one or more radial lines can be drawn and the Range of Contrast of colors can be calculated across that line. If the range meets certain criteria, then a diabetic condition may exist. Contrast Range is stored as follows:

{Contrast Range, X1, Y1, X2, Y2, NUM, MAX, MIN, AVE, STD} where

X1=The X coordinate of the first point.
Y1=The Y Coordinate of the first point.
X2=The X coordinate of the second point.
Y2=The Y Coordinate of the second point.
NUM=The number of pixels in the line
MAX=The highest value found in the range.
MIN=The lowest value found in the range.
AVE=The average value found in the range.
STD=The standard deviation found in the range.

Not only can a Global Histogram Equalization function be applied to the entire image, but a Local Histogram Equalization function can be performed on a selected area of interest by calculating the equalization on only the points within the indicated area of interest. When a Local Histogram Equalization is performed, the adjusted local pixel values are applied to the entire image that is in virtual memory. This technique enhances the selected area of the image at the expense of the quality of the unselected area. The values of the coordinates of the Histogram Equalization are saved to the Analysis File when the analysis is saved. Just as in the case of the Zoom function, the Histogram Equalization may be used to temporarily enhance an image while landmarks are being selected. Therefore, the user is prompted at the time the Analysis File is saved to allow him to indicate whether he wishes to save the Analysis File with the Histogram Equalization turned "on."

When the user selects an image for applying the Automatic Analysis function to, the CPU does not take over completely. The selection of Automatic Analysis causes the CPU to query the Image Database for the type of image selected (for example, cervical lateral, thoracic lateral, lumbar lateral, cervical A/P, etc.) and sequentially prompts the user for a list of predetermined, pre-identified landmarks.

Figure 3:
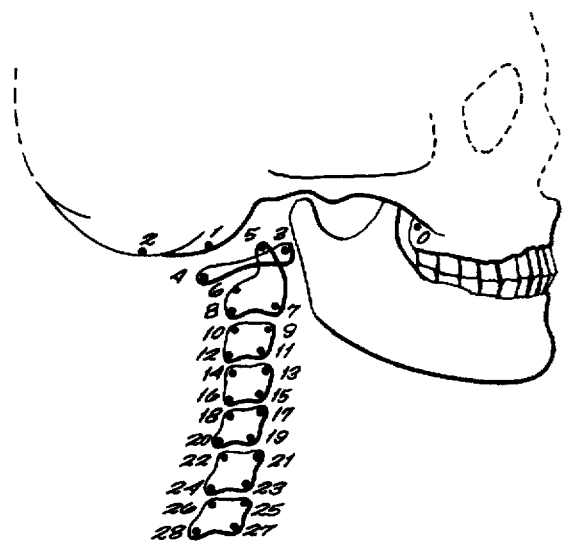
FIG. 3 is a line drawing of a cervical lateral image to show the points of interest for analysis.
Figure 4:
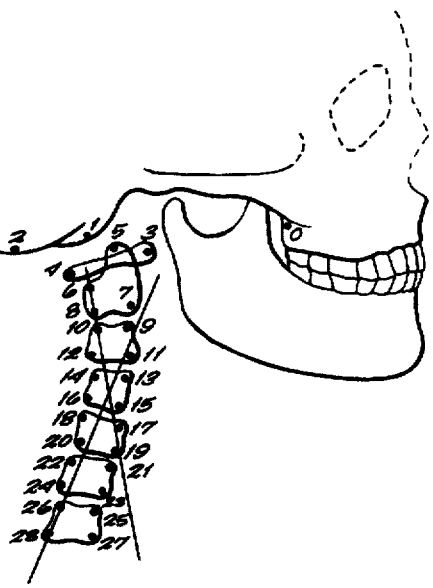
FIG. 4 is the line drawing of FIG. 3 with two lines marked on it for cervical lateral stress angle analysis.
Figure 5:
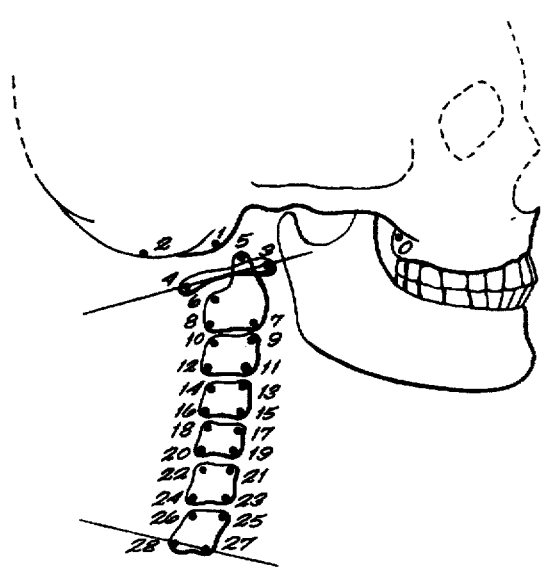
FIG. 5 is the line drawing of FIG. 3 with two lines marked on it for cervical lordosis angle analysis.

For example, as shown in FIGS. 3, 4, and 5, there are 29 specific points of interest in the analysis of a cervical lateral x-ray that must be collected in order to perform a specific, defined set of calculations that comprise the analysis of a cervical lateral. The following points have been defined as useful for the purpose of producing a particular chiropractic report on the cervical lateral view. This data is also saved as a ASCII text file in the Analysis File for easy recall when performing an analysis on a cervical lateral image: (see FIG. 3)

| Point Number | Description |
| --- | --- |
| Point Number 00: | Posterior Superior Hard Pallet |
| Point Number 01: | Anterior Skull Base |
| Point Number 02: | Posterior Skull Base |
| Point Number 03: | C1 Anterior |
| Point Number 04: | C1 Posterior |
| Point Number 05: | Apex of the adontoid |
| Point Number 06: | C2 Anterior Inferior |
| Point Number 07: | C2 Posterior Superior |
| Point Number 08: | C2 Posterior Inferior |
| Point Number 09: | C3 Anterior Superior |
| Point Number 10: | C3 Posterior Superior |
| Point Number 11: | C3 Anterior Inferior |
| Point Number 12: | C3 Posterior Inferior |
| Point Number 13: | C4 Anterior Superior |
| Point Number 14: | C4 Posterior Superior |
| Point Number 15: | C4 Anterior Inferior |
| Point Number 16: | C4 Posterior Inferior |
| Point Number 17: | C5 Anterior Superior |
| Point Number 18: | C5 Posterior Superior |
| Point Number 19: | C5 Anterior Inferior |
| Point Number 20: | C5 Posterior Inferior |
| Point Number 21: | C6 Anterior Superior |
| Point Number 22: | C6 Posterior Superior |
| Point Number 23: | C6 Anterior Inferior |
| Point Number 24: | C6 Posterior Inferior |
| Point Number 25: | C7 Anterior Superior |
| Point Number 26: | C7 Posterior Superior |
| Point Number 27: | C7 Anterior Inferior |
| Point Number 28: | C7 Posterior Inferior |

When the CPU detects that a cervical lateral image has been selected for Automatic Analysis (from the ScanType variable stored in the Image Database), it loads the "Cervical Lateral Automatic Analysis Landmark Data File" that contains the Point Numbers of each Landmark and their descriptions. These Landmarks are requested by the CPU in numeric sequence using landmarks that are common to those skilled in radiology. By initially prompting the user for the Posterior Superior Point of the hard palate (the roof of the mouth) and continuing on to "C7 Posterior Inferior", each Point Number and its X and Y coordinates can be obtained and stored in the Analysis File for later reference, using the convention previously described.

Unlike the Manual Analysis function, the Automatic Analysis function is rigidly structured in terms of what can be done. For the Automatic Analysis, Points are collected, and brightness, contrast and histogram equalization can be performed as well as the User Zoom function. However, no other drawing and calculation features are available in the Automatic Analysis function. When the Automatic Analysis is saved, the description given to it in the Analysis Database is "A:Points Only." The saved description of a Manual Analysis, on the other hand, is determined by the user.

At this point we have a patient, an image, and a set of points that have been collected from the image and stored in an Analysis File that was created in the Automatic mode. In this example from chiropractic practice, and using the cervical lateral view, the points and their coordinates are used to determine the existence (or non-existence) of physical conditions that represent a wide range of possible problems such as structural instability, subluxations, fractures, hypermobility, hypomobility, disc translation, decreased range of motion, scoliosis, etc. Many of the these calculations use the same or some of the same landmarks. By storing the Landmark coordinates in the Analysis File and then by storing a set of files such that each file contains a set of instructions detailing what to do with those coordinates to produce a given calculation, a large variety of calculations can be extracted from one set of Landmarks. For example, FIG. 3 shows a Cervical Lateral image with 29 points that can be collected using the Automatic Analysis method discussed here. With the standard collection of landmarks obtained with this Automatic Analysis, the following analyses and calculations are possible:

Arlen's Method of Flexion\Extension Analysis

Disc Angles

George's Line

Gravity Line

Line of Bull

Lordosis

McGregor's Line

Penning's Method of Flexion\Extension Analysis

Static Vertebral Malpositions

Stress Lines

Van Akkerveekens calculation of Spinal instability

This is a partial list of calculations common in chiropractic practice that can be made using a Cervical Lateral image and the 29 points shown.

When the user is ready to view or print the analysis, a set of prompts appears and asks the user to select from a list the specific analysis that he wishes to see. The list of possible analyses is fixed by the ScanType of the image. Each different image view (ScanType) has a completely different set of calculations that can be extracted from its collected set of data. If the Stress Lines calculation is selected (as illustrated in FIG. 4), then the "Cervical Lateral Stress Line Automatic Analysis Data File" is opened. It contains the following instructions that are used in relation to the data contained in the Analysis File:

1: Cervical Lateral Stress Lines

2: Line_P.006,008

3: Line_P.028,026

4: Angle, 026, 028,006, 008, Stress Lines Angle=

These lines are interpreted by the CPU as follows

1: Title line only-not functional

2: Draw a line from Point 6 through and past Point 8

3: Draw a line from Point 28 through and past Point 26

4: Measure the angle formed by points 6, 8, 26, and 28 and then make a label that says "Stress Lines Angle=" followed by the angle calculation made from the coordinates of the four points. Place the label at the bottom center of the image on the screen or printout.

What is seen on the monitor is shown in FIG. 4.

If the Lordosis measurement is selected, as illustrated in FIG. 5, the data file containing the information for the "Cervical Lateral Lordosis Automatic Analysis Data File" is opened. It contains the following instructions that are used in relation to the data contained in the Analysis File:

1: Cervical Lateral Lordosis

2: Line,003,004

3: Line ,028,027

4: Angle, 028, 027,003,005, Cervical Lordosis=

These lines are interpreted by the CPU as follows

1: Title line only-not functional

2: Draw a line through Point 3 and Point 4

3: Draw a line through Point 28 and Point 27

4: Measure the angle formed by points 3, 4, 27, and 28 and then make a label that says "Cervical Lordosis=" followed by the angle calculation made from the coordinates of the four points. Place the label at the bottom center of the image on the screen or printout.

What is seen on the monitor is shown in FIG. 5

Figure 11:
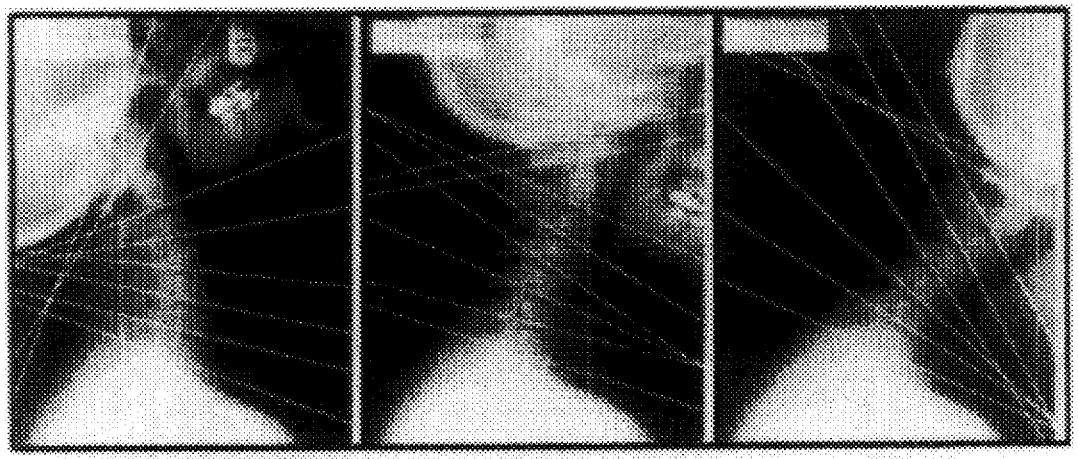
FIG. 11 is a photograph illustrating a page of a report generated with a preferred embodiment of the present invention.
Figure 11:
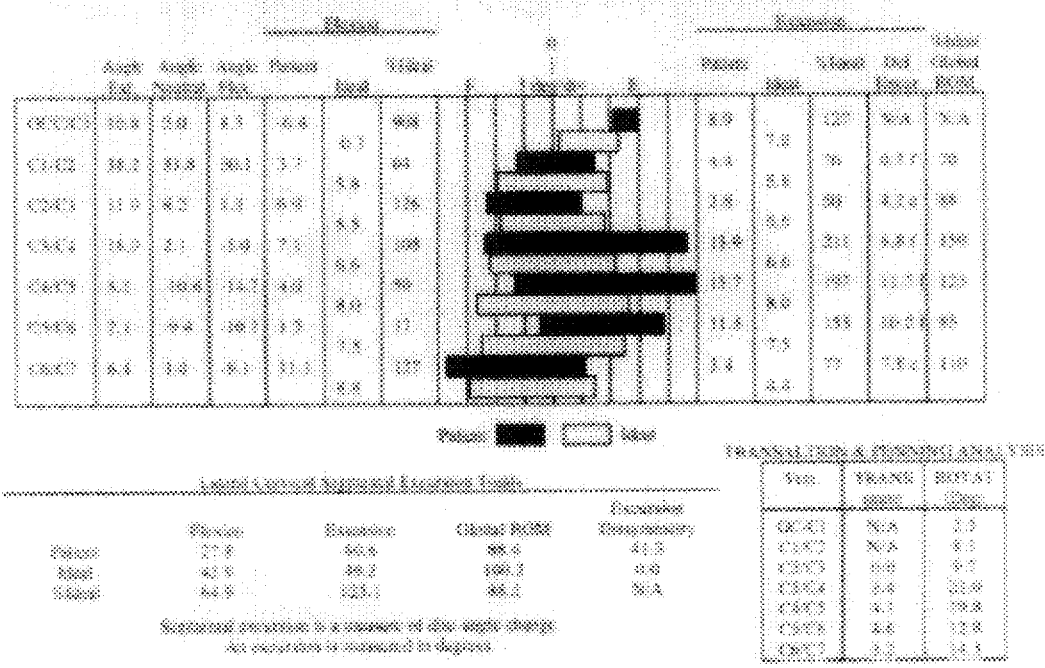

If the Arlen Method of Flexion/Extension Analysis (as described by Arlen, S.: Radio-Functional Analysis of the Cervical Spine Using the Arlen Method, J. Neuroradiology, 16, 48–64,1989) is selected, then the CPU checks for the existence of three specific images (see FIG. 11 ) of the selected patient (cervical lateral neutral, cervical lateral flexion and cervical lateral extension) and also checks to see that all three have an Automatic Analysis performed on them. If these conditions are met, then the CPU proceeds to calculate the translatory and rotated position of each vertebra relative to the position of the vertebra below it. The amount of translation and rotation of each vertebra is compared to the same vertebra in each image of the three image series. The objective of this specific analysis is to determine if there is sufficient motion of the cervical spine, both globally and within each vertebral segment. It is possible that there is sufficient global Range of Motion (ROM) of the cervical spine, but the motion may also be concentrated in one or two vertebrae instead of being distributed evenly across all seven cervical vertebrae. Range of motion calculations are an integral part of determining permanent impairment ratings per the fourth edition of the American Medical Association's Impairment Rating Guide, thus there exists a need to perform the analysis in an objective, repeatable, documented fashion.

Note that these calculations are performed entirely in RAM memory and only appear as overlays on the monitor or on the image when in printed form. The enhanced image and data created are only temporary and the calculations are not retained. However, the CPU can reconstruct any analysis whenever needed.

In use, the user scans a desired image into a computer and then extracts an Analysis File of useful data and enhancements for that image. The invention has a built in array of possible calculations and measurements for each one of a variety of image ScanTypes. From this array (see FIG. 6), the user can select the set of calculations that is required for the specific patient if the images are available for that patient. Each selected calculation can then be applied to the image in sequence and then sent to the printer.

Additionally, the entire list of calculations can be viewed in sequence on a particular image view once the Analysis File has been obtained. (See FIG. 6 under Cervical Lateral.) Threshold values for each calculation are stored with the list of instructions that the CPU uses to compare landmark positions. The calculation instruction files are stored as independent data files. If the normal value of the Cervical Lordosis should be 40.0 degrees and the CPU calculates a value below 36.0 degrees or above 44.0 degrees for this patient (a 10 percent threshold), then this calculation is retained for printing along with the definition of the possible problem that includes a reference back to the literature that supports the findings. (See FIGS. 10a–d, comparing a to b, and c to d.) Multiple thresholds are also available. If the patient's Cervical Lordosis deviates from normal by 20 percent, then a more severe suggestion is to be made. Each calculation of the many possible calculations is performed for each image that has just one Analysis File extracted from it. The patient's image with the enhancements (including contrast adjustments, zoom and landmark extraction data) is then printed simultaneously with and along side an image of a "comparative standard" or a healthy person on whom a similar analysis has been performed. (See FIGS. 10a and b, and 10c and d.) The net results of this process are threefold. First, a large number of different calculations and analyses can be viewed on the monitor in sequence by having retained just one image and one Analysis File. Second, a comprehensive printed report can be generated that shows multiple images that each have a multiple of analyses produced from Analysis File data. Third, threshold data can be included with each separately stored calculation file such that if the Threshold Option is selected, the report will only contain calculations and analyses that break the threshold values.

The following is an actual printout of an Analysis file. Line numbers have been added to allow for an explanation of each line, which is follows:

1: A
2: SDX
3: SDX1016
4: SCOTT
5: JAMES C.
6: A:Points Only.
7: SDX1190.BMP
8: −1
9: 05-09-1990
10: 0
11: 0
12: 0
13: 0
14: 1
15: 1
16: 350
17: 305
18: 824
19: 976
20: Points Only., JAMES C. SCOTT
21: Enhanced Image: B=0, C=1, HE=1, Zoom=
22: 0
23: 1
24: 0
25: SCALE, 1.675
26: Future 1
27: Future 2
28: 55
29: 1
30: 29
31: 4
32: {Point, 0,548, 72}
33: {Point, 1,406,256}
34: {Point, 2,371,593}
35: {Point, 3,556,350}
36: {Point, 4,409,610}
37: {Point, 5,666,502}
38: {Point, 6,545,476}
39: {Point, 7,615,545}
40: {Point, 8,695,516}
41: {Point, 9,634,561}
42: {Point, 10,757,591}
43: {Point, 11,687,623}
44: {Point, 12,773,626}
45: {Point, 13,692,642}
46: {Point, 14,805,687}
47: {Point, 15,733,703}
48: {Point, 16,816,733}
49: {Point, 17,741,727}
50: {Point, 18,832,794}
51: {Point, 19,751,797}
52: {Point, 20,842,840}
53: {Point, 21,762,83:2}
54: {Point, 22,837,909}
55: {Point, 23,757,89:3}
56: {Point, 24,829,9623}
57: {Point, 25,754,920}
58: {Point, 26,805,1027}
59: {Point, 27,733,989}
60: {Point, 28,486,398}
61: {Point, 231,666, 502}
62: {Point, 232,726, 553}
63: {Point, 233,789, 656}
64: {Point, 234,824, 763}
65: {Point, 235,839, 874}
66: {Point, 236,817, 995}
67: {Point, 237,243, 199}
68: {Point, 261,580, 507}
69: {Point, 262,660, 592}
70: {Point, 263,712, 672}
71: {Point, 264,746, 762}
72: {Point, 265,759, 862}
73: {Point, 266,743, 954}
74: {Point, 363,693, 572}
75: {Point, 364,750, 664}
76: {Point, 365,785, 762}
77: {Point, 366, 799, 868}

78: {Point, 367, 780, 974}
79: {Point, 368, 121, 99}
80: {Point, 400, 595, 423}
81: {Point, 401, 1, 0}
82: {Point, 402, 1, 0}
83: {Point, 403,486, 498}
84: {Point, 404, 121, 199}
85: {Point, 405, 0, 25}
86: {Point, 406,26, -25000}
87: {Text, 52, 78, 'Cervical Lateral Description of Problem'}
88: {CROSS, 548, 72, 7,255,0,0}
89: {CROSS, 406, 256,7,255,0,0}
90: {CROSS, 371,593,7,255,0,0}
91: {CROSS, 556,350,7,255,0,0}
92: {CROSS, 409,610,7,255,0,0}
93: {CROSS, 666,502,7,255,0,0}
94: {CROSS, 545,470,7,255,0,0}
95: {CROSS, 615,545,7,255,0,0}
96: {CROSS, 695,516,7,255,0,0}
97: {CROSS, 634,561,7,255,0,0}
98: {CROSS, 757,591,7,255,0,0}
99: {CROSS, 687,623,7,255,0,0}
100: {CROSS, 773,626,7,255,0,0}
101: {CROSS, 692,642,7,255,0,0}
102: {CROSS, 805,687,7,255,0,0}
103: {CROSS, 733,703,7,255,0,0}
104: {CROSS, 816,733,7,255,0,0}
105 {CROSS, 741,727,7,255,0,0}
106: {CROSS, 832,794,7,255,0,0}
107: {CROSS, 751,797,7,255,0,0}
108: {CROSS, 842,840,7,255,0,0}
109: {CROSS, 762,832,7,255,0,0}
100: {CROSS, 837,909,7,255,0,0}
111: {CROSS, 757,893,7,255,0,0}
112: {CROSS, 829,963,7,255,0,0}
113: {CROSS, 754,920,7,255,0,0}
114: {CROSS, 805,1027,7,255,0,0}
115: {CROSS, 733,989,7,255,0,0}
116: {CROSS, 486,398,7,255,0,0}
117: {Line$_{13}$ F, 407,521,498,529,0,0,255,1}
118: {Line—F, 392,854,524,841,0,0,255,1}
119: {Angle, 407,521,392,854, Cervical Lordosis}
120: {Contrast Range, 83,97,810,615,86,25, 111, 100,36}

An explanation of each line number that has been marked in the above file is as follows:

1: Indicates if the Analysis is "A" automatic or "M" manual. This may also contain the revision number of the file type so that subsequent versions of the file may be differentiated from each other.
2: The systems unique identification code
3: The Patient Number
4: Patient first name
5: Patient last name
6: Description of the analysis
7: Name of the image file that this Analysis File was extracted from
8: Integer flag to indicate the type of data contained
9: Date of the Analysis
10: Adjusted Zoom multiple used to display image
11: X coordinate of adjusted zoom center—integer
12: Y coordinate of adjusted zoom center—integer
13: Adjusted Brightness of image—integer (default is 1)
14: Adjusted Contrast of image—integer (default is 0)
15: Histogram On/Offswitch (−1=On, 0=Off). Note that Histogram equalization is turned off if contrast/brightness is adjusted, and brightness/contrast is reset if the histogram equalization is selected, because using these methods in parallel would not make sense mathematically relative to the resulting image.
16: Upper left X coordinate of the area selected for histogram equalization
17: Upper left Y coordinate of the area selected for histogram equalization
18: Lower right X coordinate of the area selected for histogram equalization
19: Lower right Y coordinate of the area selected for histogram equalization
20: Subtitle 1 of 2 for printout display
21: Subtitle 2 of 2 for printout display
22: Zoom value of image as needed to display the full dimensional extents of the image as received by the system. In order to display the entire image dimensionally (as in 14×17 inches), some percentage of pixels may need to be systematically skipped when displayed on the monitor because of monitor size limitations and pixel availability. The original Zoom amount is stored as an integer and is calculated as the percentage of image pixels displayed on the monitor compared to the number of image pixels actually available in the image. This calculation is based on the resolution and the physical dimensions of the original image as compared to the limitations of the monitor and is independent of any user action. This zoom calculation is needed so that a map may be drawn to connect each pixel in the zoomed image to each pixel in the 1:1 actual image.
23: Labels On/Off Flag—Determines if the text labels should be displayed or not. All Labels are saved. However, Labels may or may not be displayed upon recall, based on the user's decision.
24: Crosses On/Off Flag—Determines if the cross-hairs that mark selected landmarks should be displayed or not. All Crosses are saved. However, Crosses may or may not be displayed upon recall, based on the user's decision.
25: Scale of the image in DPI or other useful units followed by the unit of measure that should be used when displaying calculations. 1=English, 0=SI.
26: Unused location available for future revisions
27: Unused location available for future revisions
28: The number of Points included in this file. Integer
29: The number of Labels included in this file. Integer
30: The number of Crosses included in this file. Integer
31: The number of graphic instructions (lines, circles angles etc.) included in this file. Integer
32-86: Points (landmark locations) that have either been collected or calculated based on points previously collected in the analysis. The number of points listed is previously determined and stored on line (28) of this file. Also note that points 0-28 are actually collected by having the CPU prompt the user. The balance of points have been calculated. These calculations may also be performed by the CPU at a later time.

87–115: Crosses (landmark markings) that have been collected. The number of Crosses listed is previously determined and stored on line (29) of this file.

The reason for storing enhancements and data extractions separate from the original image are numerous. First, because of storage space limitations and the speed of modern CPU calculations, it is wise to reduce the amount of data that needs to be stored and allow the CPU to perform calculations redundently. Thus, by saving image enhancements as a macro that is written specifically for the image, there is no need to save an enhanced image. Second, data extracted from images needs to be related back to the image using means that allows text, graphics, landmarks, and other useful data to be combined with user-selected measurements. The image, the enhancement and data that comprise the Analysis File and the list of desired measurements are then united in virtual memory, displayed on the monitor, and can be printed in a variety of output formats. The use of multipurpose file formats (ASCII Text) accomplishes these tasks while still offering the data in the form of a Analysis Files for access by other computers for computation and statistical analysis.

Images of patients that are considered to fall within the normal range can be analyzed and retained. For new research, additional normal values can be determined and verified by performing the analysis on a large number of subjects and then determining if there are statistically relevant relationships.

Because the comparatively normal values are known for many traditional measurements, it is simple to enter and include normal images into the system database and image storage areas. These images and their Analysis Files can then be used for comparison to the patient undergoing treatment.

Figure 6:
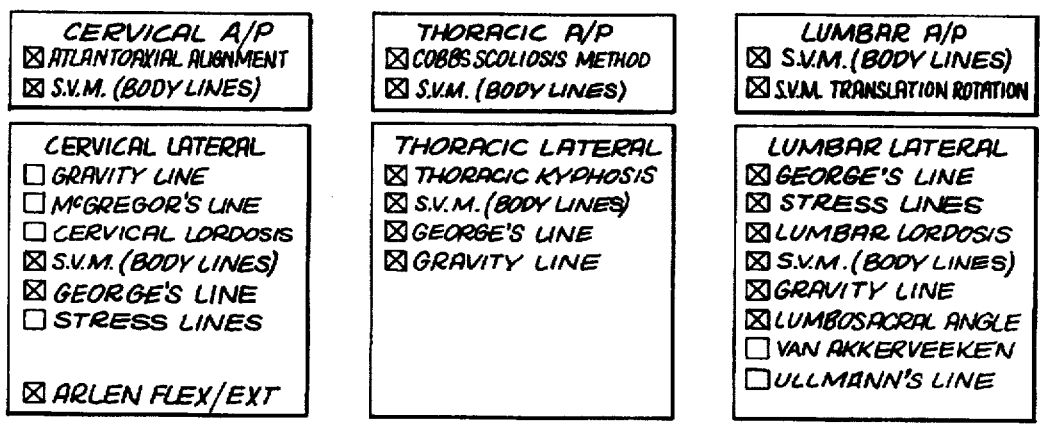
FIG. 6 is an illustration of a set of menus of analyses that may be selected for each x-ray view in an embodiment of the present invention suitable for chiropractic use.

Once an image is analyzed once in Automatic Mode and the corresponding normal image has also been acquired and analyzed, it is a simple task to set up a host of calculations, as shown in the menus illustrated in FIG. 6, that can be extracted from these Analysis Files and then presented in a report. (See the example of a page of a report generated with a preferred embodiment according to the present invention illustrated in FIG. 11) The patient image and the normal image are printed with the calculations of interest shown as overlays. Either image may also have been enhanced to make the areas of interest easier to read.

The preferred embodiment of the present invention can generate twelve different calculations from a single cervical lateral image. Standard calculations have also been set up for all the major views of the spine, hip, and extremities.

The CPU reads one independently stored data file to learn what points to collect from an image. The CPU then reads another independent data file to learn how to connect those points in order to perform a specific calculation. Since these data files are not part of the executable software program it is easy to construct data sets that allow for many different calculation to be made. Also, because the resulting Analysis File is stored in ASCII text format and tracked in a database format that is widely accepted, the extracted image data can be used by other systems as well.

It is possible to suggest a diagnosis without actually making a diagnosis. For example, Stress Lines of the Cervical Spine were investigated by Ruth Jackson (see *The Cervical Syndrome*, ed 4, Springfield, C. C. Thomas 1977) who shows how decreased curvature of the cervical spine can be determined by measuring the angle formed by lines drawn from the posterior bodies of C2 and C7. A normal angle should be 43 degrees with the intersection of the two lines occurring at the C4/C5 interspace. According to chiropractic theory, significant deviation from this measurement may suggest muscle spasm, subluxation, joint degeneration, ligamentous laxity, fracture, or general instability. The CPU is capable of suggesting a diagnosis; however, without clinical information, the CPU obviously cannot make a diagnosis. Because all of the data points required to determine the Stress Lines measurement are collected in an Automatic Analysis of a cervical lateral spine, this type of analysis of an image is typical for this embodiment.

When the normal cervical lateral and patient's cervical lateral are printed side-by-side with Stress Lines and the angle of the stress lines drawn on them, it is very easy to determine the degree of deviation compared to normal range angles. Reports prepared by the present invention typically include a text reference that is printed directly below each printed analysis. The user also has the opportunity to include his own text with each printed image. Because the CPU is capable of extracting information from an image and normal images can be stored for comparison, it is a simple task to assist the doctor with a diagnosis without actually making the diagnosis. It is also simple to extract a series of conditions that are of increasing severity and relate them to different possible diagnoses. This degree of analysis extends the present invention from a chiropractic embodiment, wherein spinal measurements are performed, and into sizing requirements for hip replacement, eye examinations, and quality assurance testing.

Although this type of Analysis File is what is used in applying a preferred embodiment of the present invention to chiropractic, it is easy to see that many different types of information and attributes of the enhanced/analyzed image can also be extracted, stored and related back to the unmodified image in the same manner.

It will be clear to those skilled in the art of radiographic analysis that many changes and substitutions can be made to the preferred embodiment described above without departing from the spirit and scope of the present invention which is defined by the appended claims.

What is claimed is:

1. A system for analyzing a radiograph in the form of a digital image, said system comprising:

a central processing unit;

input means for receiving said digital image, said input means controlled by said central processing unit;

permanent storage means responsive to said central processing unit for permanently storing said digital image received by said input means so that said stored digital image cannot be modified;

temporary storage means responsive to said central processing unit for temporarily storing said digital image for display, said temporary storage means storing said digital image separate from said permanent storage means;

means in communication with said temporary storage means for displaying a copy of said digital image stored in said temporary storage means;

means for making enhancements for said displayed copy; and enhancement storage means in communication with said central processing unit for storing said enhancements separate from said digital image stored in said permanent storage means and in said temporary storage means, said central processing unit causing said enhancements to be brought from said enhancement storage means and making said enhancements to said displayed copy whenever said copy is to be displayed, so that no enhanced image need be saved.

2. The system as recited in claim 1, wherein said digital image has landmarks and wherein said enhancement making means further comprises:
   means for identifying said landmarks on said displayed copy of said digital image; and
   means for calculating spatial data and relationships among said landmarks.

3. The system as recited in claim 1, wherein said enhancement making means further comprises means for incorporating text with said displayed copy so that said text will be displayed with said displayed copy by said displaying means.

4. The system as recited in claim 1, wherein said digital image has landmarks and wherein said enhancement making means further comprises:
   means for identifying said landmarks on said displayed copy of said digital image; and
   means for calculating angular relationships among said landmarks.

5. The system as recited in claim 1, wherein said digital image has landmarks and wherein said enhancement making means further comprises:
   means for identifying said landmarks on said displayed copy of said digital image; and
   means for calculating contrast differences between said landmarks.

6. The system as recited in claim 1, wherein said central processing unit has means for comparing said digital image with other digital images and enhancements from said displayed copy.

7. The system as recited in claim 1, wherein said central processor further comprises:
   means for extracting a data set from said digital image;
   means for applying a preselected set of calculation types to said data set to produce a set of calculations; and
   means for displaying said calculations with said digital image.

8. The system as recited in claim 1, further comprising a reference digital image and wherein said central processing unit further comprises means for comparing enhancements associated with said digital image to enhancements associated with said reference digital image.

9. The system as recited in claim 1, wherein said system is used to obtain images of the vertebra of a human cervical spine including cervical lateral neutral, flexion and extension images, and wherein said central processing unit further comprises:
   means for analyzing said images;
   means for calculating the translatory and rotated position of each vertebra relative to the vertebra below it for said cervical lateral neutral, flexion and extension images; and
   means for comparing the translatory and rotated positions of each vertebra of said cervical lateral neutral, flexion and extension images to determine range of motion of the cervical spine.

10. A system for analyzing a radiograph, said system comprising:
    a central processing unit;
    means for scanning said radiograph and producing a digital image of said radiograph, said scanning means controlled by said central processing unit;
    permanent storage means responsive to said central processing unit for permanently storing said digital image received by said input means so that said stored digital image cannot be modified;
    temporary storage means responsive to said central processing unit for temporarily storing said digital image for display, said temporary storage means storing said digital image separate from said permanent storage means;
    means in communication with said temporary storage means for displaying a copy of said digital image stored in said temporary storage means;
    means for making enhancements for said displayed copy; and
    enhancement storage means in communication with said central processing unit for storing said enhancements separate from said digital image stored in said permanent storage means and in said temporary storage means, said central processing unit causing said enhancements to be brought from said enhancement storage means and making said enhancements to said displayed copy whenever said copy is to be displayed so that no enhanced image need be saved.

11. The system as recited in claim 10, wherein said digital image has landmarks and wherein said enhancement making means further comprises:
    means for identifying said landmarks on said displayed copy of said digital image; and
    means for calculating spatial data and relationships among said landmarks from said digital image.

12. The system as recited in claim 10, wherein said enhancement making means further comprises means for incorporating text with said displayed copy so that said text will be displayed with said displayed copy by said displaying means.

13. The system as recited in claim 10, where, in said digital image has landmarks, said landmarks defining boundaries, and wherein said enhancement making means further comprises:
    means for identifying said landmarks on said displayed copy of said digital image; and
    means for calculating angular relationships among said landmarks; and
    means for calculating contrast adjustments over said boundaries.

14. The system as recited in claim 10, wherein said central processor further comprises:
    means for extracting a data set from said digital image;
    means for storing said data set separate from said digital image;
    means for applying a preselected set of calculation types to said data set to produce a set of calculations; and
    means for displaying said calculations with said displayed copy.

15. The system as recited in claim 14, further comprising a reference digital image and wherein said central processing unit further comprises means for comparing an extracted data set of said digital image with an extracted data set of said reference digital image.

16. The system as recited in claim 10, wherein said enhancement making means further comprises means for zooming in on a portion of said digital image, said displaying means displaying a copy of said portion.

17. A system for analyzing a radiograph, said system comprising:

a central processing unit;

input means for receiving said digital image, said input means controlled by said central processing unit;

permanent storage means responsive to said central processing unit for permanently storing said digital image received by said input means so that said stored digital image cannot be modified;

temporary storage means responsive to said central processing unit for temporarily storing said digital image for display, said temporary storage means storing said digital image separate from said permanent storage means;

a monitor controlled by said central processing unit for displaying a copy of said digital image stored in said temporary storage means;

means for zooming in on a portion of said displayed copy, said monitor displaying said portion;

means for making enhancements for said displayed copy, said enhancements including means for identifying said landmarks, means for calculating relationships among said landmarks, and labeling means for making labels; and enhancement storage means in communication with said central processing unit for storing said enhancements separate from said digital image stored in said permanent storage means and in said temporary storage means, said central processing unit causing said enhancements to be brought from said enhancement storage means and making said enhancements to said displayed copy whenever said copy is to be displayed so that no enhanced image need be saved.

18. The system as recited in claim 17, wherein said monitor displays both said copy and said copy with said enhancements simultaneously.

19. The system as recited in claim 17, further comprising means for printing copies of said digital image and said enhanced digital image.

20. The system as recited in claim 17, wherein said enhancement making means further comprises means for incorporating text with said displayed copy so that said text will be displayed with said displayed copy by said displaying means.

* * * * *